United States Patent [19]
Estrin

[11] Patent Number: 6,048,587
[45] Date of Patent: Apr. 11, 2000

[54] WATER-DISPERSIBLE, RADIATION AND THERMALLY-CURABLE POLYMERIC COMPOSITIONS

[75] Inventor: Tanya Estrin, Grand Junction, Colo.

[73] Assignee: Ricon Resins, Inc., Grand Junction, Colo.

[21] Appl. No.: 09/164,737

[22] Filed: Oct. 1, 1998

[51] Int. Cl.[7] ........................................ B05D 3/06
[52] U.S. Cl. .................. 427/496; 427/388.1; 427/389.7; 427/393.5; 526/262; 526/272; 526/286; 526/304; 526/312; 526/320
[58] Field of Search ............................. 525/10; 427/496, 427/388.1, 389.7, 393.5; 526/262, 272, 286, 304, 312, 320

[56] References Cited

U.S. PATENT DOCUMENTS

| | | | |
|---|---|---|---|
| 3,841,895 | 10/1974 | Hick | 117/72 |
| 3,855,379 | 12/1974 | Araki et al. | 260/77.5 CR |
| 3,959,554 | 5/1976 | Hick | 428/336 |
| 4,224,357 | 9/1980 | Iwai et al. | 427/44 |
| 5,268,257 | 12/1993 | Mirle et al. | 430/285 |
| 5,691,006 | 11/1997 | Salvin et al. | 427/510 |

FOREIGN PATENT DOCUMENTS

| | | |
|---|---|---|
| 51-000534 | 1/1976 | Japan . |
| 58-070868 | 4/1983 | Japan . |
| 58-204058 | 11/1983 | Japan . |
| 01020213 | 1/1989 | Japan . |
| 01020215 | 1/1989 | Japan . |
| 01020216 | 1/1989 | Japan . |
| 02091111 | 9/1990 | Japan . |

OTHER PUBLICATIONS

Puskas, J.E., et al. (1988), "New polyisobutylene–based UV–curable flexible coatings," Polymer Bull. 20:253–260.

*Primary Examiner*—Erma Cameron
*Attorney, Agent, or Firm*—Greenlee, Winner and Sullivan, P.C.

[57] ABSTRACT

Radiation-curable resins as well as thermal and electron-beam-curable resins are provided comprising a polymeric backbone having acrylate or vinyl ether substituents and an ionically bonded neutralizing agent such as an aminoacrylate. These resins are hydrophilic and water-dispersible before curing, but resistant to most solvents including water after curing while preserving a hard, strong, adhesive character which makes them suitable for use as coatings and fabrication of three-dimensional structures in a wide variety of applications.

20 Claims, No Drawings

WATER-DISPERSIBLE, RADIATION AND THERMALLY-CURABLE POLYMERIC COMPOSITIONS

BACKGROUND OF THE INVENTION

Polybutadiene (PBD) is a soft, low modulus though tough, elastomeric polymer, generally unsuited as a coating for such materials as flooring, furniture, appliances, electronic components, motor vehicle parts and the like that require a hard, clear, scuff-resistant protective and glossy surface. However, polymers such as polybutadiene having molecular weights higher than about 3,000 g/M would be desirable for use in coatings since their relatively high molecular weight would result in less shrinkage upon curing than other materials having lower molecular weights.

Radiation-curable materials are desirable for their ease of curing. Such materials include (meth) acrylic and vinyl monomers from BASF, oligomers of polyesteracrylate, epoxy acrylate, and urethane acrylate from UCB Chemicals Corp., acrylate-terminated PBD from Sartomer Co., and Ro Shield™ of Rohm and Haas Company, as well as Ricacryl® 3100 and Ricacryl® 3500, methacrylated PBDs of Ricon Resins, Inc.

Such radiation-curable materials known to the art have many disadvantages. In general, ultraviolet curable coatings adhere to a narrow range of substrates and have low resistance to water, chemicals and solvents after curing. Those designed to form hard coatings tend to form brittle coatings, and those designed to form flexible coatings tend to form coatings that are too soft. Such materials are not soluble or dispersible in water and must often be mixed with toxic solvents or reactive diluents to decrease their viscosities enough for spraying or painting on a substrate, with consequent harm to the environment when the solvents evaporate. Reactive diluents may increase toxicity and sometimes prevent full curing initially, resulting in changing properties over time. Many radiation-curable materials are mixtures of adhesion agents, dispersion agents, plasticizers, cross-linking agents and wetting agents which must be specially compounded at the site of application. Further, in previously-known acrylate/methacrylate-functionalized polybutadiene-based radiation-curable resins, the acrylate functionalities are not optimized by number or type to provide sufficient crosslinking to produce hard, adherent or solvent-resistant coatings.

A number of radiation-curable resins have been described in the literature. U.S. Pat. No. 3,855,379 issued Dec. 17, 1974 to Araki et al. for "Novel Polybutadiene Derivative Curable with Ionizing Radiation" discloses radiation-curable coating materials made by reacting a polymeric butadiene with an isocyanate compound having a vinyl group. U.S. Pat. No. 4,224,357 issued Sep. 23, 1980 to Iwai et al. for "Method and Composition for Forming Electron Beam Curing High Build Coating" discloses making a high build coating film by mixing a polymerizable resin which has at least two polymerizable unsaturated double bonds and at least one hydroxyl group with a polyisocyanate and curing by irradiation.

Puskas, J. E., et al. (1988), "New polyisobutylene-based UV-curable flexible coatings," Polymer Bull. 20:253–260, discloses ultra-violet-curable coatings prepared from acrylate and methacrylate-capped linear or three-arm star polyisobutylenes in the presence of multifunctional acrylates or methacrylate esters.

Japanese Patent Publications No. 01020215 A and 01020216 A, both published Jan. 24, 1989 for "Photocurable Resin Composition" (abstracts) disclose photocurable resin compositionsmodified with a carboxylic acid-terminated rubber and having photo/radical-polymerizable functional groups on the molecular ends mixed with a compound having at least one dicyclopentenyl group or isobornyl group. Japanese Patent Publication No. 01020213 A published Jan. 24, 1989 for "Photocurable Resin Composition" discloses a polybutadiene resin obtained by mixing photocurable telechelic polybutadiene resin having photo/radical-polymerizable functional groups on the molecular ends with a reactive group such as phenoxypolyethylene glycol acrylate and adding a silane coupling agent. Japanese Patent Publication No. 02091111 A published Mar. 30, 1990 for "Photocurable Resin Composition" (abstract) describes a blended photocurable composition comprising a hydrogenated polybutadiene with a photopolymerization initiator and an unsaturated carboxylic acid derivative having phosphorus in the molecule.

None of the foregoing references disclose water-soluble or water-dispersible coating materials.

U.S. Pat. No. 3,841,895 issued Oct. 15, 1974 to Hick for "Flexible Hydrocarbon Rubber Substrate Finished with a Thermosetting Acrylic Enamel" and a divisional patent thereof, U.S. Pat. No. 3,959,554 issued May 25, 1976 to Hick for "Aqueous Thermosetting Acrylic Enamel for Finishing Flexible Hydrocarbon Rubber Substrates" disclose a composition comprising acrylic polymers, carboxylic acid polymers, and a heat-reactive condensate such as polyisocyanate, which can be neutralized to form a water-based finish with ammonia or an amine such as diethylethanol amine. These materials do not appear to be radiation-curable and the neutralizing amines do not contribute to the performance of the material.

Water-dispersible radiation-curable materials are described, for example, in U.S. Pat. No. 5,268,257 issued Dec. 7, 1993 to Mirle et al. for "Aqueous Developable, Photocurable Composition, and Flexible, Photosensitive Articles Made Therefrom" which discloses a water-dispersible composition prepared by reacting a solid carboxylated copolymer having at least one pendent carboxyl group with a photosensitive vinyl-containing compound and optionally maleic anhydride. The carboxyl groups are necessary so that when the photopolymer is exposed to light under a mask, the unexposed parts can be washed away with water or alkali solution.

This material does not contain ionic bonds. The polymer is not highly water dispersible and is not used as a water-based resin. U.S. Pat. No. 5,691,006 issued Nov. 25, 1997 to Salvin et al. for "Solder Resist Coating from Photosensitive Composition Containing Water as Solvent or Dispersant" discloses a composition comprising water soluble or dispersible, solid, film-forming polymers, photopolymerizable acrylate or methacrylate monomers or oligomers, and photoinitiator compounds. These compounds may be reacted with ammonia and/or amines which volatilize from the film formed when the material is cured.

None of the foregoing references appear to describe a composition which is radiation-curable and water-dispersible due to the presence of ionic bonds.

There is a need in the art for a single compound capable of being used as a coating material without being dispersed or dissolved in a solvent or capable of being dispersed in water, which can adhere to a wide variety of substrates, and be cured by ultraviolet or other radiation or heat or electron beam treatment in a very short period of time to a hard, tough and durable finish which is not soluble in water or other solvents such as toluene, acetone, gasoline and the like.

SUMMARY OF THE INVENTION

The radiation-curable resins of this invention are hydrophilic and water-dispersible before curing, but they are resistant to most solvents including water after curing, while preserving a strong adhesive character making them suitable for use as coatings in a wide variety of applications. The compositions of this invention include the polymeric resins described herein and may additionally include crosslink initiators known to the art. The compositions of this invention also include dispersions of such resins and crosslink initiators (if present) in water or other liquid carriers, preferably at concentrations between about 10 and about 99 weight percent.

The uncured polymeric resin compositions of this invention are polymer chains made up of segments having the general formula:

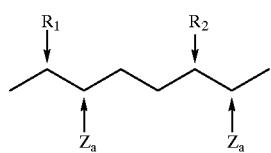

wherein $\wedge\!\!\wedge\!\!\wedge$ denotes a section of the polymeric backbone which may be saturated or unsaturated;

wherein the arrows denote that the pendant groups may be attached to the backbone at any point, and that varying quantities of the pendant groups may be present in each of the sections of each molecule of the polymeric resin;

wherein Z is a hydrocarbyl which does not substantially interfere with crosslinking hydrophilicity or stability of the composition, and where a is 0 or 1;

wherein $R_1$ is selected from the group consisting of A' and B', where A' is

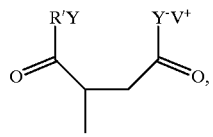

where R' is an acrylate moiety

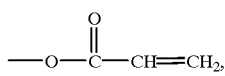

or a vinyl ether moiety —R—O—CH=CH$_2$;
  where R is $C_1$–$C_{20}$ alkyl or aryl which does not substantially interfere with the crosslinking, hydrophilicity or stability of the composition;
  Y is —O, —N or —S; and
  where V$^+$ is an alkali metal or alkaline earth metal ion or ammonium ion which does not substantially interfere with the hydrophilicity of the composition, or is H$^+$R'''
    where R''' is R'- or R''-substituted amine or phosphine;
      where R'' is an acrylate moiety having 2 to 12 acrylate groups and which does not substantially interfere with the stability of the composition; and where B' is

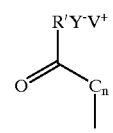

where R', Y and V$^+$ are as set forth above; n is 0–10; and
wherein $R_2$ is selected from the group consisting of A'' and B''
  where A''

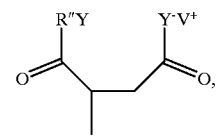

is
  where R'', Y. and V$^+$ are as set forth above, and
  B'' is

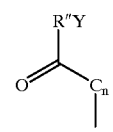

where R'' and Y are as set forth above, and n is 0–10.

Preferably the polymeric backbone is a polybutadiene.

Preferably Z is H, vinyl, or alkyl vinyl, providing double bonds which contribute to the crosslinking of the composition; however Z may be any substituent which is not so bulky as to interfere with crosslinking or hydrophilicity, and which does not make the composition unstable, i.e., does not provide so many double bonds that crosslinking occurs spontaneously or results in a cured composition more brittle than desired. Adjusting crosslink density by adjusting available sites is well known to the art and Z may be optimized for compositions of any desired properties by those skilled in the art.

The length of the backbone polymer chains is selected to provide a molecular weight to the composition between about 1000 and 100,000, preferably greater than about 3000 as determined by gel permeation chromatography (GPC).

Y is preferably —O.

V$^+$ may be any ion capable of providing water dispersibility to the composition and preferably is an organic ion providing crosslinking sites to the composition. Most preferably it is an acrylate ion having one to five acrylate groups.

R' is preferably a single acrylate moiety, more preferably a methacrylate moiety, and most preferably hydroxyethylmethacrylate (HEMA).

R'' is preferably a five-acrylate moiety, and more preferably is dipentaerythritolhydroxypentaacrylate (DPHPA).

R''' preferably comprises dimethylaminoethylmethacrylate (DMAEMA).

$R_1$ and $R_2$ preferably comprise A' and A'', respectively.

The molar ratio of R' to R'' is preferably between about 1:3 and 9:1.

Preferably the composition containing R', R'' and R''' contains between about 6 to about 13 moles of acrylate moieties per mole. It is preferred that the composition comprise about 3 to about 5 moles of single-acrylate substituents per mole and about 0.25 to about 2 moles of multiple-acrylate, preferably penta-acrylate, substituents per mole.

Acrylate groups are useful to provide fast curing and to add crosslinking density to the cured product for strength and resistance to solvents, chemicals and water.

The methods of making the resins of this invention comprise reacting a polymeric backbone having pendant carboxyl or dicarboxylic anhydride groups with a compound having acrylate or vinyl ether moieties having a reactive substituent such as OH, NH, or SH to form an intermediate composition of this invention comprising esters, amides or thio esters depending on the reactive group used, of said acrylate or vinyl ether compounds. The intermediate compound is then neutralized with a neutralizing agent which lends water-dispersibility to the composition. Any such neutralizing agent may be used. Preferably the neutralizing agent is an amine of an acrylate or vinyl ether compound.

As will be apparent to those skilled in the art, reactive catalysts for reacting the acrylate and/or vinyl ether compounds with the polymeric backbone material may be required, e.g., tertiary amines or other catalysts known to the art. The reactions may be conducted with or without solvents, and other reaction conditions may be varied depending on the compounds being used, all as known to the art.

It is not necessary that all carboxyl or dicarboxylic anhydride groups be reacted. Sufficient acrylate or vinyl ether moieties should be reacted into the composition to provide sites for neutralization and crosslinking required to produce the desired properties in the final product.

The compositions of this invention may have viscosities between about 5000 CPS and about 300,000 CPS, and preferably have viscosities low enough, e.g., less than about 100,000, so that they can be applied as coatings without dilution. Viscosities referred to herein are measured by Brookfield viscometer at about 45° C. The resins of this invention may be dispersed in water or other solvents, e.g., acetone, toluene, heptane, methylethylketone, isobutyl ketone, ethyl acetate, styrene, xylene or other aromatic or aliphatic solvents known to the art for application. Reactive diluents such as hexanediol diacrylate (HDODA), trimethylolpropane triacrylate (TMPTA), polyethyleneglycol methacrylate (PEG-MA) and ethoxylated phenol monoacrylate (EB-110) may also be used.

The resins of this invention are preferably mixed with crosslink initiators known to the art for initiation of radiation or thermal curing, such as Irgacure 500, Irgacure 361, tertbutylperoxybenzoate and cumine hydroperoxide.

The compositions of this invention may be cured by exposure to electromagnetic radiation such as ultraviolet (UV), infrared (IR) visible light, X-rays, gamma rays and microwaves, or electron beams (EB), or heat (temperatures preferably between about 50° C. and about 200° C.). Crosslink initiators such as free radical or ionic initiators known to the art are usually required but may not be necessary for EB curing.

The materials of this invention cure to hard, water-insoluble, solvent-resistant materials. Curing takes place rapidly, within a few milliseconds (i.e., no more than about 10 milliseconds for the preferred embodiments, and in general within less than about 60 seconds).

The use of resins of this invention eliminates the need for drying ovens and their high energy requirements and simplifies the coating process, contributing to greater worker safety. Since there is no need for toxic solvents, there is no pollution problem. Use of these resins leads to lower overall production costs because of the low-temperature processing, reduced floor space requirements, and reduced work in process during any given time period, as well as providing increased production efficiency through increased yield and throughput speed. The reactive sites of the materials of this invention have high conversion rates, i.e., greater than about 70%, and thus the properties of the cured materials are less susceptible to change over time than materials made using acrylate monomers which have lower conversion rates.

These materials are capable of adhesively bonding during curing to a wide variety of substrates and are useful in a broad range of applications. They may be used as coatings, ink resins, adhesives and sealants, primers, adhesion promoters, 3D-imaging/stereolithographic resins, dental and medical materials, conformal coatings for electronic applications, solder masks, photoresists, anaerobic adhesives and photo-developable polymers used, for example, in printing plates.

They may also be fabricated, e.g., by curing in a suitable mold, into such products as aspherical lenses, contact lenses and the like. Rapid prototyping can be done using such materials. The cured materials of this invention may also be micromachined.

DETAILED DESCRIPTION OF THE INVENTION

In the preferred embodiment, water-dispersible resins of this invention are formed by reacting a polybutadiene adduct of maleic anhydride, having segments as shown below:

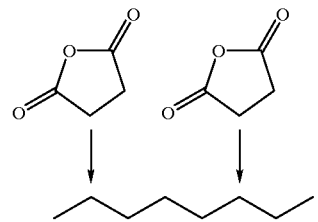

where ᗱᐯᐯ denotes a section of the polymeric backbone which may be saturated or unsaturated and the arrows indicate that the pendant groups may be attached to the backbone at any point, and that varying quantities of the pendant groups may be present in each of the sections of the polymeric adduct;

2-hydroxyethyl methacrylate (HEMA):

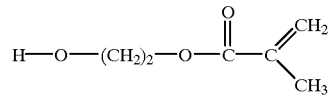

and dipentaerythritol hydroxypentaacrylate (DPHPA):

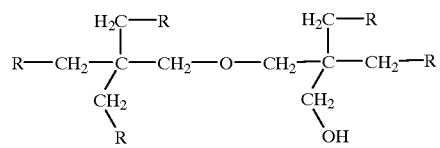

wherein R is

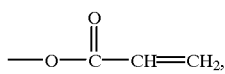

to form an intermediate compound having segments of the structure:

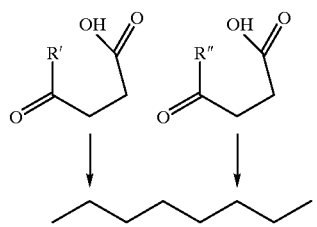

where R' is 2-hydroxyethylmethacrylate and R" is dipentaerythritolhydroxypentacrylate.

This intermediate compound is then contacted with dimethyl aminoethyl methacrylate (DMAEMA):

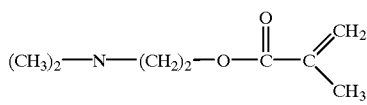

to form the radiation-curable, water-dispersible resins of the preferred embodiment having segments of the structure:

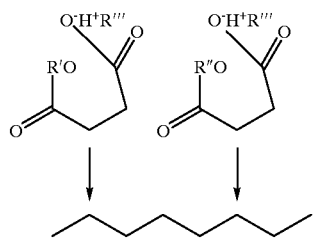

where R' is HEMA, R" is DPHPA, and R''' is a DMAEMA ion.

A preferred embodiment of the radiation curable resins of this invention is formed by adducting maleic anhydride (MA) to a high vinyl polybutadiene (PBD) resin having more than 30%, and preferably more than 70%, vinyl. Suitable PBDs 5 include but are not limited to Ricon 157, Ricon 154 or Ricon 130, preferably Ricon 157, from Ricon Resins, Inc., Grand Junction, Colo. Preferably the PBD is adducted to contain about 13% MA. Suitable adducted PBDs include maleinized PBDs from Ricon Resins, Inc. such as Ricon 157MA13. Then the radiation-curable resin is formed by reacting hydroxyl acrylate/methacrylate, e.g., 2-hydroxyethylmethacrylate (HEMA), with a portion of the anhydride groups through the anhydride ring opening reaction to add acrylate/methacrylate functionality to the PBD resin. At the same time a multifunctional hydroxyl acrylate/methacrylate, e.g., dipentaerythritolhydroxypentaacrylate (DPHPA), is reacted with the remaining anhydride groups to also add acrylate/methacrylate functionality. With five acrylates per molecule, the DPHPA aids in development of crosslink density upon curing, which optimizes hardness, maximizes solvent and chemical resistance, and minimizes water absorption. The reaction of the hydroxyl group of the acrylate compounds with the cyclic anhydrides forms half-esters containing the acrylate/methacrylate functionality. The carboxylic acid group of the half-esters is then stoichiometrically reacted with a tertiary amino acrylate/methacrylate, e.g., dimethylamino ethylmethacrylate (DMAEMA), resulting in complete neutralization of the acid groups.

In other embodiments, other polymeric backbones may be adducted to other dicarboxylic acid or anhydride moieties and reacted with other acrylate compounds and neutralizing agents by analogous reactions and as described below. The carboxylic acid group of the half-ester can also remain un-neutralized, or can be neutralized with other amines or phosphines and the like, whether substituted or not, or can be neutralized with a soluble ammonium or alkali or alkaline earth metal salt (e.g. $Na^+$, $K^+$) or other complex basic materials such as alkyl substituted amines and polyamines. The amino acrylate/methacrylate, e.g. dimethylaminoethyl methacrylate (DMAEMA) or other material added to neutralize the remaining COOH acid groups, assures the aqueous dispersibility (hydrophilicity) of the uncured resin. It also enhances the wetting of substrate by the uncured resin. The methacrylate functionality of the DMAEMA upon reacting into the polymer during curing irreversibly suppresses its mobility and thus its dispersibility. The amine or other neutralizing functionality, however, continues to serve in optimizing the adhesion of the cured resin to a variety of substrates. The resulting cured resin is a tough, water, chemical and solvent-resistant thermoset polymer.

Although radiation-curable or heat-curable, the resins of this invention may also be mixed with conventional curing agents such as peroxide or sulfur if curing by conventional means is desired. Oven-curing may be done, or if a curing agent such as a peroxide which is unstable at room temperature is used, the material should harden without application of heat within less than an hour.

The resin compositions of this invention may be applied to any substrate (surface) desired including surfaces of plastics, rubbers, metal, wood, cloth, fibers, stone, paper, ceramics, concrete, glass and fabric.

The term "cure" is an art-recognized term and means that sufficient cross-linking has occurred so as to, e.g., provide a maximum torque reading (MH) when tested on a standard oscillating disk rheometer (ODR) at a chosen constant temperature. The process of curing results in a material that is hard, strong, and will not soften upon heating. An uncured composition of this invention is one which has not been subject to curing but which is capable of being cured.

The terms "polymer" and "polybutadiene polymer" as used herein include, but are not limited to, substituted polymers bearing non-interfering groups such as styryl and nitrile. These non-interfering groups do not prevent curing reactions or adversely affect the properties of the cured resin. Many such non-interfering groups will be readily apparent to those skilled in the art and include, but are not limited to, methyl, ethyl, benzyl, tolyl, cyclohexyl, etc., and non-highly-reactive substituents and non-bulky substituents such as cyano or fluoro.

The term "hydrocarbyl" is used herein to refer generally to organic radicals comprised of carbon chains to which hydrogen and optionally other elements are attached. $CH_2$ or CH groups and C atoms of the carbon chains of the hydrocarbyl may be replaced with one or more heteroatoms (i.e., non-carbon atoms). Suitable heteroatoms include but are not limited to O, S and N atoms. The term hydrocarbyl includes, but is not limited to alkyl, alkenyl, alkynyl, ether, thioether, aminoalkyl, hydroxylalkyl, thioalkyl, aryl and heterocyclic aryl groups, groups which have a mixture of saturated and unsaturated bonds, carbocyclic rings and combinations of such groups. The term also includes straight-chain, branched-chain and cyclic structures or combinations thereof. Hydrocarbyl groups are optionally substituted. Hydrocarbyl substitution includes substitution at one or more carbons in the group by moieties containing heteroatoms. Suitable substituents for hydrocarbyl groups include but are not limited to OH, SH, $NH_2$, COH, $CO_2H$, $OR_a$, $SR_a$, $NR_aR_b$, $CONR_aR_b$, and halogens where $R_a$ and $R_b$ independently are alkyl, unsaturated alkyl or aryl groups.

The term "alkyl" takes its usual meaning in the art and is intended to include straight-chain, branched and cycloalkyl groups. The term includes, but is not limited to, methyl, ethyl, n-propyl, isopropyl, n-butyl, sec-butyl, isobutyl, tert-butyl, n-pentyl, neopentyl, 2-methylbutyl, 1-methylbutyl, 1-ethylpropyl, 1,1-dimethylpropyl, n-hexyl, 1-methylpentyl, 2-methylpentyl, 3-methylpentyl, 4methylpentyl, 3,3-dimethylbutyl, 2,2-dimethylbutyl, 1,1-dimethylbutyl, 2-ethylbutyl, 1-ethylbutyl, 1,3-dimethylbutyl, n-heptyl, 5-methylhexyl, 4-methylhexyl, 3-methylhexyl, 2-methylhexyl, 1-methylhexyl, 3-ethylpentyl, 2-ethylpentyl, 1-ethylpentyl, 4,4dimethylpentyl, 3,3-dimethylpentyl, 2,2-dimethylpentyl, 1,1-dimethylpentyl, n-octyl, 6-methylheptyl, 5-methylheptyl, 4-methylheptyl, 3-methylheptyl, 2-methylheptyl, 1-methylheptyl, 1-ethylhexyl, 1-propylpentyl, 3-ethylhexyl, 5,5-dimethylhexyl, 4,4-dimethylhexyl, 2,2-diethylbutyl, 3,3-diethylbutyl, and 1-methyl-l-propylbutyl. Alkyl groups are optionally substituted. Lower alkyl groups are $C_1$–$C_6$ alkyl and include among others methyl, ethyl, n-propyl, and isopropyl groups.

The term "cycloalkyl" refers to alkyl groups having a hydrocarbon ring, particularly to those having rings of 3 to 7 carbon atoms. Cycloalkyl groups include those with alkyl group substitution on the ring including other ring structures. Cycloalkyl groups can include straight-chain and branched-chain portions. Cycloalkyl groups include but are not limited to cyclopropyl, cyclobutyl, cyclopentyl, cyclohexyl, cycloheptyl, cyclooctyl, and cyclononyl. Cycloalkyl groups can optionally be substituted.

Compounds possessing substantially the same properties as the unsubstituted aryl compounds of this invention and which can be prepared in the same manner and are equivalents thereof are those wherein the aryl group bears one, two or more simple substituents including, but not limited to, lower alkyl, e.g., methyl, ethyl, butyl; halo, e.g., chloro, bromo; nitro; sulfato; sulfonyloxy; carboxy; carbo-lower-alkoxy, e.g., carbomethoxy, carbethoxy; amino; mono- and di-lower-alkylamino, e.g., methylamino, ethylamino, dimethylamino, methylethylamino; amido; hydroxy; lower-alkoxy, e.g., methoxy, ethoxy; and lower-alkanoyloxy, e.g., acetoxy.

The term "unsaturated alkyl" group is used herein generally to include alkyl groups in which one or more carbon-carbon single bonds have been converted to carbon—carbon double or triple bonds. The term includes alkenyl and alkynyl groups in their most general sense. The term is intended to include groups having more than one double or triple bond, or combinations of double and triple bonds. Unsaturated alkyl groups include, without limitation, unsaturated straight-chain, branched or cycloalkyl groups. Unsaturated alkyl groups include without limitation: vinyl, allyl, propenyl, isopropenyl, butenyl, pentenyl, hexenyl, hexadienyl, heptenyl, cyclopropenyl, cyclobutenyl, cyclopentenyl, cyclopentadienyl, cyclohexenyl, cyclohexadienyl, 1-propenyl, 2-butenyl, 2-methyl-2-butenyl, ethynyl, propargyl, 3-methyl-1-pentynyl, and 2-heptynyl. Unsaturated alkyl groups can optionally be substituted.

Substitution of alkyl, cycloalkyl and unsaturated alkyl groups includes substitution at one or more carbons in the group by moieties containing heteroatoms. Suitable substituents for these groups include but are not limited to OH, SH, $NH_2$, COH, $CO_2H$, $OR_c$, $SR_c$, $NR_cR_d$, $CONR_cR_d$, and halogens, particularly chlorines and bromines where $R_c$ and $R_d$, independently, are alkyl, unsaturated alkyl or aryl groups. Preferred alkyl and unsaturated alkyl groups are lower alkyl, alkenyl or alkynyl groups having from 1 to about 3 carbon atoms.

The term "aryl" is used herein generally to refer to aromatic groups which have at least one ring having a conjugated pi electron system and includes without limitation carbocyclic aryl, aralkyl, heterocyclic aryl, biaryl groups and heterocyclic biaryl, all of which can be optionally substituted. Preferred aryl groups have one or two aromatic rings.

"Carbocyclic aryl" refers to aryl groups in which the aromatic ring atoms are all carbons and includes without limitation phenyl, biphenyl and napthalene groups.

"Aralkyl" refers to an alkyl group substituted with an aryl group. Suitable aralkyl groups include among others benzyl, phenethyl and picolyl, and may be optionally substituted. Aralkyl groups include those with heterocyclic and carbocyclic aromatic moieties.

"Heterocyclic aryl groups" refers to groups having at least one heterocyclic aromatic ring with from 1 to 3 heteroatoms in the ring, the remainder being carbon atoms. Suitable heteroatoms include without limitation oxygen, sulfur, and nitrogen. Heterocyclic aryl groups include among others furanyl, thienyl, pyridyl, pyrrolyl, N-alkyl pyrrolo, pyrimidyl, pyrazinyl, imidazolyl, benzofuranyl, quinolinyl, and indolyl, all optionally substituted.

"Heterocyclic biaryl" refers to heterocyclic aryls in which a phenyl group is substituted by a heterocyclic aryl group ortho, meta or para to the point of attachment of the phenyl ring to the decalin or cyclohexane. Heterocyclic biaryl includes among others groups which have a phenyl group substituted with a heterocyclic aromatic ring. The aromatic rings in the heterocyclic biaryl group can be optionally substituted.

"Biaryl" refers to carbocyclic aryl groups in which a phenyl group is substituted by a carbocyclic aryl group ortho, meta or para to the point of attachment of the phenyl ring to the decalin or cyclohexane. Biaryl groups include among others a first phenyl group substituted with a second phenyl ring ortho, meta or para to the point of attachment of the first phenyl ring to the decalin or cyclohexane structure. Para substitution is preferred. The aromatic rings in the biaryl group can be optionally substituted.

Aryl group substitution includes substitutions by non-aryl groups (excluding H) at one or more carbons or where possible at one or more heteroatoms in aromatic rings in the aryl group. Unsubstituted aryl, in contrast, refers to aryl groups in which the aromatic ring carbons are all substituted with H, e.g. unsubstituted phenyl (—$C_6H_5$), or napthyl (—$C_{10}H_7$). Suitable substituents for aryl groups include among others, alkyl groups, unsaturated alkyl groups, halogens, OH, SH, $NH_2$, COH, $CO_2H$, $OR_e$, $SR_e$, $NR_eR_f$, $CONR_eR_f$, where $R_e$ and $R_f$ independently are alkyl, unsaturated alkyl or aryl groups. Preferred substituents are OH, SH, $OR_e$, and $SR_e$ where $R_e$ is a lower alkyl, i.e. an alkyl group having from 1 to about 3 carbon atoms. Other preferred substituents are halogens, more preferably chlorine or bromine, and lower alkyl and unsaturated lower alkyl groups having from 1 to about 3 carbon atoms. Substituents include bridging groups between aromatic rings in the aryl group, such as —CO$_2$—, —CO—, —O—, —S—, —NH—, —CH=CH— and —(CH$_2$)$_l$— where l is an integer from 1 to about 5, and particularly —CH$_2$—. Examples of aryl groups having bridging substituents include phenylbenzoate. Substituents also include moieties, such as —(CH$_2$)$_l$—, —O—(CH$_2$)$_l$— or —OCO—(CH$_2$)$_l$—, where l is an integer from about 2 to 7, as appropriate for the moiety, which bridge two ring atoms in a single aromatic ring as, for example, in a 1,2,3,4-tetrahydronaphthalene group. Alkyl and unsaturated alkyl substituents of aryl groups can in turn optionally be substituted as described supra for substituted alkyl and unsaturated alkyl groups.

The terms "alkoxy group" and "thioalkoxy group" (also known as mercaptide groups, the sulfur analog of alkoxy groups) take their generally accepted meaning. Alkoxy groups include but are not limited to methoxy, ethoxy, n-propoxy, isopropoxy, n-butoxy, sec-butoxy, isobutoxy, tert-butoxy, n-pentyloxy, neopentyloxy, 2-methylbutoxy, 1-methylbutoxy, 1-ethyl propoxy, 1,1-dimethylpropoxy, n-hexyloxy, 1-methylpentyloxy, 2-methylpentyloxy, 3-methylpentyloxy, 4-methylpentyloxy, 3,3-dimethylbutoxy, 2,2-dimethoxybutoxy, 1-1-dimethylbutoxy, 2-ethylbutoxy, 1-ethylbutoxy, 1,3-dimethylbutoxy, n-pentyloxy, 5-methylhexyloxy, 4-methylhexyloxy, 3-methylhexyloxy, 2-methylhexyloxy, 1-methylhexyloxy, 3-ethylpentyloxy, 2-ethylpentyloxy, 1-ethylpentyloxy, 4,4dimethylpentyloxy, 3,3-dimethylpentyloxy, 2,2-dimethylpentyloxy, 1,1-dimethylpentyloxy, n-octyloxy, 6-methylheptyloxy, 5-methylheptyloxy, 4-methylheptyloxy, 3-methylheptyloxy, 2-methylheptyloxy, 1-methylheptyloxy, 1-ethylhexyloxy, 1-propylpentyloxy, 3-ethylhexyloxy, 5,5-dimethylhexyloxy, 4,4-dimethylhexyloxy, 2,2-diethylbutoxy, 3,3-diethylbutoxy, 1-methyl-1-propylbutoxy, ethoxymethyl, n-propoxymethyl, isopropoxymethyl, sec-butoxymethyl, isobutoxymethyl, (1-ethyl propoxy)methyl, (2-ethylbutoxy)methyl, (1-ethylbutoxy)methyl, (2-ethylpentyloxy)methyl, (3-ethylpentyloxy)methyl, 2-methoxyethyl, 1-methoxyethyl, 2-ethoxyethyl, 3-methoxypropyl, 2-methoxypropyl, 1-methoxypropyl, 2-ethoxypropyl, 3-(n-propoxy)propyl, 4-methoxybutyl, 2-methoxybutyl, 3-(n-propoxy)propyl, 4-methoxybutyl, 2-methoxybutyl, 4-ethoxybutyl, 2-ethoxybutyl, 5-ethoxypentyl, and 6-ethoxyhexyl. Thioalkoxy groups include but are not limited to the sulfur analogs of the alkoxy groups specifically listed supra.

"Optional" or "optionally" means that the subsequently described event or circumstance may or may not occur, and that the description includes instances where said event or circumstance occurs and instances in which it does not. For example, "optionally substituted phenyl" means that the phenyl radical may or may not be substituted and that the description includes both unsubstituted phenyl radicals and phenyl radicals wherein there is substitution.

Polymeric adducts useful for this invention are made using any polymeric resin capable of forming a monocarboxylic, dicarboxylic or polycarboxylic acid or derivative adduct A preferred polymeric resin is an unsaturated polymer comprising at least one monomer which is a conjugated diene containing 4–12 carbon atoms. The polymer may additionally comprise a monomer which is a vinyl-substituted aromatic compound containing carbon atoms. Polybutadienes are preferred polymers. A preferred polymer is a random 1,2 or 1,4 polybutadiene homopolymer preferably containing from about 20 to about 90 percent 1,2 vinyl groups. Unless specified otherwise, as used herein such percents are percents of total unsaturation of the resin. Preferably the polymer comprises a mixture of 1,2 and 1,4 modes of addition and contains cis and trans unsaturation in the backbone of the polymer chain and vinyl unsaturation pendant to the polymer chain. Polyisoprenes, substituted polybutadienes, styrene butadienes and styrene isoprene co-polymers are all useful for purposes of this invention. Cyclic and polycyclic unsaturated hydrocarbons, e.g., cyclododecatriene, norbornene, cyclooctadiene and substituted homologs can also be used as a backbone. In addition, polymeric adducts can be made using backbones of unsaturated longer chain aliphatic compounds such as ethylene propylene diene (EPDM), partially unsaturated polyethylene, naphthaleneic or paraffinic oils. Synthetic drying oils known to the art from which adducts may be produced may be made by polymerization of other materials including myracene, cyclopentadiene and higher homologs up to about C$_{20}$ or co-polymers of these monomers with each other in any ratio, or copolymers made with other vinyl-reactive monomers such as styrene, vinyl toluene, divinyl benzene, vinyl chloride, vinylidene dichloride, acrylonitrile, etc.

The polymeric adducts useful in this invention may also be made from naturally-occurring, renewable-resource-based unsaturated drying oils including linseed oil, tung oil, soy oil, caster oil, cashew oil, and other such oils commonly used in the coatings industry to manufacture air-drying paints and coatings.

Unsaturated dimers and trimers made by heating tall oil may also be used to make the polymeric adducts useful in this invention.

To make the adducts, adductable materials such as organic acid or derivative materials such as anhydrides may be used. Maleic anhydrides are especially suitable, however, other organic acids, anhydrides and derivatives capable of being adducted to the polymeric backbones described herein are known to the art or may be ascertained without undue experimentation. Such adductable materials include alpha, beta-ethylenically unsaturated dicarboxylic acid compounds represented by the following general formula:

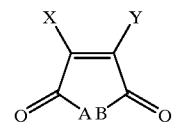

wherein X and Y are hydrogen atoms, alkyl groups, or other non-bulky substituents which do not interfere with the adduction reaction of these compounds to the backbone polymer, and may be the same or different; and A and B are hydroxyl groups, alkoxyl groups, alkyl-substituted amine groups or an —O— bond formed by linking A and B together through a bonded oxygen or an —N(—R)— bond, where R may be alkyl or hydrogen, formed by linking A and B together through an imide linkage.

These alpha,beta-ethylenically unsaturated dicarboxylic acid compounds include anhydrides of maleic acid such as maleic anhydride, and esters of maleic acid such as monomethyl maleic acid, dimethyl maleic acid and diethyl maleic acid, and those having 12 or less carbon atoms in each molecule may be most advantageously used. Such derivatives may also include maleamides such as N,N'-dimethyl diamide of maleic acid and maleimide. These dicarboxylic acid compounds and derivatives are capable of being adducted at weight percent levels of less than 1% to as much as about 30%. Preferably the adducted moiety comprises between about 3% and about 20% of the polymeric adduct.

The term "unsaturated backbone" in reference to the polymer used to make the adduct means that the polymer contains double and/or triple bonds in the backbone (continuous portion) of the molecule. Preferably, the polymer backbone contains between about 5 and about 40 unsaturated bonds per about 3000 g/M of the preferred embodiment of the invention, preferably double bonds.

The polymeric adduct contains pendant dicarboxylic acid anhydride rings or pendant dicarboxylic acid groups, and pendant SH, OH or NH groups. In the preferred embodiment, free pendant groups are succinic acid anhydride rings which are the maleic rings which have become saturated upon reacting into the PBD backbones, and thus become succinic anhydride rings. The preferred embodiment also comprises pendant ethylene groups in an amount of between about 3 and about 53 per 3000 g/M of the preferred embodiment.

Suitable polymeric adducts for use in this invention are commercially available or may be made by processes known to the art, e.g. as disclosed in U.S. Pat. No. 5,300,569 incorporated herein by reference to the extent not inconsistent herewith.

The term "acrylate moieties" as used herein includes unsubstituted and substituted acrylate moieties, including but not limited to methacrylate and ethyl, propyl, fluoro, silicone, etc. acrylate. Compounds comprising acrylate moieties useful for reacting with the polymeric backbones may have from one to twelve acrylate moieties so long as the resin remains stable (does not spontaneously cure). One or more compounds, having different numbers of acrylate moieties, may be reacted with the polymeric adducts to provide intermediate compounds having a desired number of acrylate moieties. The number of acrylate moieties should be sufficient to allow rapid cure with a crosslink density high enough to result in a cured resin that is tough, resistant to water, solvents and chemicals and adheres well to a wide variety of surfaces, but not so great as to be brittle, unstable in the absence of radiation or heat, or to adversely affect the adhesive properties. The inventor has found that the desired amount of acrylate moieties can be most easily achieved by using a ratio of a compound having a single acrylate moiety to a compound having five acrylate moieties of between about 1.5 and about 19. Other means for achieving the desired number of acrylate moieties on the resins of this invention include but are not limited to direct addition of acrylate moieties to the polymer backbone or formation of acrylate moieties through dehydrogenation of suitable pendant groups, as is known to the art.

The acrylate and/or vinyl ether groups are covalently bonded to carbonyl carbons pendant to the backbone of the polymeric adduct, preferably by a reaction in which anhydride ring structures are opened if necessary to provide carbonyl carbons on a branched substituent pendant from the backbone, which react with acrylate and/or vinyl groups in the presence of a catalyst known to the art, e.g., a tertiary amine such as DAMA-1010 of Ethyl Corporation. Reactions to add two or more separate acrylate or vinyl ether compounds to the polymer backbone can take place simultaneously.

The intermediate compound formed by reacting the acrylate- or vinyl ether-containing compounds with the polymeric adduct is then reacted with a neutralizing agent to form the compounds of this invention. The neutralizing agent may be an amine, phosphine, alkali metal salt, alkaline earth metal salt, ammonium salt, or any other compound known to the art for forming salts with carboxylic acid groups. Preferably, the neutralizing compound comprises moieties containing double bonds capable of cross-linking with the remainder of the polymer upon curing to provide a hard, solvent-resistant cured material.

The reaction of the acrylate-containing intermediate compound with the neutralizing agent is performed by simply contacting the intermediate with the neutralizing agent, with the use of solvents, stirring, heating or other standard reaction conditions as known to the art.

The viscosity of the resins of this invention may be adjusted by varying the number of anhydride moieties present on the backbone before adding acrylates and/or vinyl ether moieties. Some anhydride moieties may remain unreacted. The viscosity of the resin can also be adjusted by adjusting the number of pendant vinyls on the backbone, and adjusting the molecular weight of the molecule. In general, more substituents on the backbone provide a more viscous resin. Less viscous embodiments may be applied to a substrate neat (without dilution). More viscous embodiments may be dispersed in carriers such as water or other solvents for application. Reactive diluents which are low molecular weight, low-viscosity acrylate or vinyl monomers or oligomers capable of crosslinking into the resin as it cures, as known to the art, may also be used as carriers.

This invention provides a single molecule having adhesion functionality (provided primarily by the interaction of the non-polar polymeric backbone with the more polar neutralizing compound), water dispersibility (also provided primarily by the neutralizing compound), flexibility (provided primarily by the polymeric backbone), the capacity to be cured by ultraviolet or other radiation (provided primarily by the acrylate and/or pendant vinyl moieties), and the ability to wet the substrate to which it is applied (provided primarily by the interaction of the non-polar polymeric backbone with the more polar neutralizing compound). Compounding and mixing the coating material at the site where the resin is to be applied is thus avoided and the time expended in staging and compounding the ingredients is saved, errors and inconsistencies in blending are eliminated (which provides a more uniform crosslinked network), hazards associated with working with flammable and/or hazardous monomers are reduced, and the necessity for costly inventories of a variety of chemicals, many of which are toxic, is avoided.

Preferred embodiments of this invention also provide methods for making water-dispersible, radiation-curable polymeric compositions as described above comprising reacting a polymeric adduct having an unsaturated backbone, pendant dicarboxylic acid anhydride rings, and pendant vinyl groups, with one or more compounds having acrylate and/or vinyl ether moieties, to open pendant anhydride rings and covalently bond a moiety having one or more acrylate and/or vinyl ether groups to one carbonyl carbon of substantially each opened ring, thereby forming an uncured polymeric intermediate compound, and reacting said intermediate compound with a neutralizing agent to form an uncured polymeric compound wherein one carbonyl carbon of substantially each opened anhydride ring is covalently bonded to a moiety having one or more acrylate groups, and the other carbonyl carbon of substantially each opened anhydride ring is ionically bonded to said neutralizing agent.

Reactions to add the acrylate or vinyl ether substituents to the polymeric backbone may be performed by means known to the art using catalysts including but not limited to tertiary amines at temperatures not greater than about 90° C. to reduce the possibility of crosslinking reactions that cause gelling. No catalysts are needed for the neutralizing reaction.

Also provided herein are methods for forming adherent, cured polymeric coatings on a substrate comprising applying to a substrate compositions of this invention containing a curing agent and having a viscosity allowing such application to the substrate, e.g. by painting or spraying, exposing the composition on the substrate to radiation or heat, and allowing the composition to adhesively cure to the substrate. The viscosity of the composition may be adjusted by adding water, a reactive diluent, or other solvents or carriers. No curing agents are required when EB curing is used.

The uncured resins can be applied to a variety of substrates by coating methods known to the art including, but not limited to, dip-coating, curtain coating, roll coating, spraying, etc. To facilitate spray coating, other high-viscosity neat UV-curable resins similar to those described herein are diluted with low-viscosity solvents or reactive monomers, but not with water. The resins of this invention have the advantage of being dispersible in water as well as other solvents and carriers. Any liquid material in which the resins can be suspended, dispersed or dissolved for application (including water, toluene and other organic solvents) may be used as a carrier. Preferably the concentration of resin in the carrier is greater than about 40% by weight.

The lowered viscosity (e.g. less than about 100 cps) of such resins dispersed in water or other carriers allows their use in a wide range of methods, especially spray methods, to apply the resin to a substrate prior to curing. Since dilution with solvents other than water, including reactive diluents, is not necessary to reduce the viscosity of these materials, the biological and environmental non-toxicity inherent in the neat resin is preserved. The ability of the resin to be dispersed in water also allows the addition of the resin to other aqueous systems, e.g. latex coatings and adhesives, to enhance their performance. In some instances, adhesion to specific surfaces can only be achieved if the resin is carried in water. The amino-functionality (or that of other ionic neutralizing agents) along with the nonpolar backbone of the resins enhances wetting of substrates by the uncured resin and assures adhesion to a broad range of substrates upon curing.

In the preferred embodiment hereof, made with a polybutadiene adduct of maleic anhydride, it has been found that the pendant vinyl groups as well as the cis- and trans-1, 4unsaturation on the polybutadiene backbone of the preferred resin participate in an initiated radiation-curable reaction. This attribute, along with the selected multifunctional acrylate/methacrylate monomers, e.g. DPHPA and the acrylated/methacrylated neutralizing agent, e.g. DMAEMA, generate a high density of crosslinking. Higher density of crosslinking translates into a very hard material (5 H pencil hardness) not obvious to those familiar with polybutadienes and contributes to the solvent-, water-, and chemical-resistance of the resin as well. The material exhibits extreme resistance to hot and cold water as well as a wide variety of solvents and chemicals. Resins of a molecular weight greater than 3000 g/M result in low shrinkage upon curing. Polymer chains of the material of the preferred embodiment are long, involving thirty to forty moles of monomer (degree of polymerization (DP)=30–40) as opposed to other commercial oligomer chains which have only three to five moles (DP=3–5).

The radiation-curable resins of this invention are useful in a wide range of applications. They are particularly useful for coatings, adhesives and surface modification, for example, as a tie layer or primer coat on one surface allowing adhesion of another coating, adhesive or sealant to a surface to which it does not readily adhere alone. They also improve scratch resistance, gloss, hardness and thermal resistance. They may be clear or pigmented, and may be used for wood or floor finishes and stains, for biosensor and electrode coatings and coatings for optical fibers. They may also be used for release coatings when formulated with silicone or fluorocarbon monomers or other release agents, antistatic coatings, foamed or insulated coatings, protective coatings and thermotropic gel layers for windows. In adhesive applications, they can be used as glass laminates, glass fiber composite adhesives, pressure-sensitive adhesives and sealants. Surface treatment applications include cell-repellant treatments and photografting.

Such resins are useful in lithographic and flexographic printing plates as well as laser-imageable plates, and in pre-press materials in surprint/overlay/monochrome systems, thermal imaging systems and digital imaging systems. They may also be used in inks where ultraviolet (UV) or electron-beam (EB) curable materials are required for printing methods including flexo, screen, litho, gravure, letterset, offset, and other such systems.

Electronic applications include the use of these materials as film resists, electroless plating resists, liquid resists, electrodeposition resists, solder masks, polyimide interlayer insulator films and flexible photo-imageable permanent coatings. For integrated circuits, these materials may be used as deep UV resists, E-Beam resists, microlithography, insulating and conductive pastes, as well as in selectively deposited conductive polymer systems.

Optical applications include use in liquid crystal (LC) systems for alignment of LC elements for orientation of ferro-electric materials, formation of LC polymers, and color filters for liquid crystal displays and in the formation of optical waveguides and polarizing optical elements for nonlinear optical systems as well as for microoptical systems. The materials may also be used in systems involving holographic polymer elements, components used for reversible holograms and switched holographic gratings (with LC).

The resins may also be used for rewritable recording materials (e.g. photochromic materials), and for information recording in laser ablation systems.

Medical and dental uses include uses in composite fillings, surface coatings/fillings, and the formation of impressions. They may be added to implantable bone prostheses, used to make UV-curable splints and casts, and for immobilization of enzymes and microorganisms. They may also be used for contact lenses.

In membrane technology, the materials may be used to make reverse osmosis membranes, gas-permeable membranes, amphophilic membranes and ultrafiltration membranes and modifications.

Other uses include use in battery parts that require protective coatings with high resistivity.

EXAMPLES

Example 1

Preparation of Radiation-Curable Polymer

FX9801. In a 1000 ml 3-neck flask equipped with a stirrer, thermometer, reflux condenser and heating mantel was placed 400 g maleinized polybutadiene (PBD) containing 12.13% maleic anhydride by weight (Ricon®-XS$_8$Q, Ricon Resins, Inc., Grand Junction, Colo.). To the maleinized PBD was added 51.6 g hydroxyethyl methacrylate (Mhoromer BM-903, Huls America, Inc., Piscataway, N.J.) and 51.6 g dipentaerytitol hydroxypentaacrylate (UCB Chemicals Corp., Radcure Business Unit, Smyrna, Ga,). The mixture was warmed at 60° C. and stirred for 30 minutes to obtain a uniform blend. Then 77.7 g dimethylaminoethyl methacrylate (Mhoromer BM-601, Huls America, Inc., Piscataway, N.J.) was slowly added and the reaction was allowed to continue for three hours at 60° C. to 90° C.

Example 2

Preparation of Radiation Curable Polymer, Alternative Embodiment.

FX9704. In a 1000 3-neck flask equipped with stirrer, thermometer, reflux condenser and heating mantel was placed 400 g maleinized PBD containing 13.1% maleic anhydride by weight (Ricon®-XS$_8$Q, Ricon Resins, Inc., Grand Junction, Colo.). To the maleinized PBD was added 48.6 g hydroxyethyl methacrylate (Mhoromer BM-903, Huls America, Inc., Piscataway, N.J.) and 79.6 g pentaerythritol hydroxytriacrylate (UCB Chemical Corp., Radcure Business Unit, Smyrna, Ga.). The mixture was warmed at 60° C. and stirred for 30 minutes to obtain a uniform blend. Then 83.8 g dimethylaminoethyl methacrylate (Mhoromer BM-601, Huls America, Inc., Piscataway, N.J.) was slowly added and the reaction was allowed to continue for three hours at a temperature of 60° C. to 90° C.

Example 3

Performance Properties of Radiation-Curable Resins

Compositions of this invention made with Ricacryl® (Ricon Resins, Inc., Grand Junction, Colo.) maleinated polybutadiene, neat resins FX9801 and FX9803, and FX9802 which is FX9801 dispersed in water, and FX9804 which is FX8903 dispersed in water, were tested for cured film clarity, hardness, wetting ability, dry adhesion, solvent and chemical resistance, and resistance to other materials. Results are set forth in Table 1.

TABLE 1

RICARYL ®
Typical Performance Properties

| Performance Properties[1] | FX9801 Resins | FX9802 Dispersion | FX9803 Resins | FX9804 Dispersion |
|---|---|---|---|---|
| Cured film clarity | 10 | 10 | 10 | 10 |
| Pencil hardness | 5H | 4H | 3H | 3H |
| Wetting[2] | 10 | 10 | 10 | 10 |
| Adhesion, dry | | | | |
| Gold | 0 | 10 | 0 | 10 |
| Aluminum | 0 | 10 | 0 | 0 |
| Stainless Steel | 0 | 10 | 0 | 10 |
| Copper Foil | 10 | 10 | 10 | 10 |
| Brass Foil | 5 | 10 | 0 | 10 |
| ABS | 10 | 10 | 10 | 10 |
| Flooring | 10 | 10 | 10 | 10 |
| Polycarbonate | 10 | 10 | 10 | 10 |
| Vinyl, Clear | 10 | 7 | 10 | 5 |

TABLE 1-continued

RICARYL ®
Typical Performance Properties

| Performance Properties[1] | FX9801 Resins | FX9802 Dispersion | FX9803 Resins | FX9804 Dispersion |
|---|---|---|---|---|
| Vinyl, Filled | 10 | 10 | 10 | 10 |
| BMC | 0 | 10 | 0 | 10 |
| Acrylic | 0 | 10 | 0 | 10 |
| Polypropylene, Nylon, LDPE | 0 | 0 | 0 | 0 |
| Wood | 10 | 10 | 10 | 10 |
| Solvent resistance: | | | | |
| Toluene, acetone, nail polish remover, ethyl acetate, ethanol, gasoline, white wine, red wine | | | | |
| Chemical resistance | | | | |
| Formula 409 | 10 | | 10 | |
| Sulfuric acid, con. | 10 ds | | 10 ds | |
| Windex | 10 | | 10 | |
| HCl | 10 | | 10 | |
| HNO$_3$ | 10 | | 10 | |
| GW detergent | 10 | | 10 | |
| Vinegar | 10 | | 10 | |
| Miscellaneous[3] | 10 | 10 | 10 | 10 |

[1]1% IRGACURE 500 based on dry resin. All films are 1 mil dry. Cured for 1.5 minutes using UVEXS (300–500 nm, 7 mw per sq cm, 840 mj). Performance Scale of 0–10 (10 = best). ds = discoloration.
[2]Wood, aluminum, steel, copper, gold, glass, acrylic, polycarbonate, Teflon ®.
[3]Resistance to boiling water, coffee, coke, bleach, ketchup, mustard, canola oil, WD oil, motor oil.

Example 4

Comparison of Performance Properties with Other LW-Curable Products

Film clarity and hardness of FX9801, FX9802, FX9803 and FX9804 were compared with Ebecryl® 3700 (epoxy acrylate) and 6700 (urethane acrylate) from UCB of Smyrna, Ga., and Roshield® 3120 from Rohm and Haas of Philadelphia, Pa., a leading commercial acrylated emulsion. FX9801 and FX9803 were tested in addition for water absorption at hot and ambient temperatures and compared with Ebercryl® 6700 and Ebercryl® 3700. The results are set forth in Table 2.

TABLE 2

General Performance Properties

| | Ricon Resins, Inc. | | Commercial Oligomers | |
|---|---|---|---|---|
| | | | EB 6700 | EB 3700 |
| Typical Performance | RICARYL ® | | Urethane Acrylate | Epoxy Acrylate |
| | FX9801 | FX9803 | | |
| Cured film clarity[1] | 10 | 10 | 10 | 10 |
| Pencil hardness[1] | 5H | 3H | 5B | 2H |
| Water Absorption[2] | | | | |
| Hot (100° C., 2 hours, ASTM D570) | 0.86 | 1.02 | 3.00 | 1.08 |
| Ambient (23° C., 24 hours, ASTM D570) | 0.36 | 0.24 | 0.98 | 0.25 |

TABLE 2-continued

General Performance Properties

| Typical Performance | Ricon Resins, Inc RICACRYL® | | Roshield® 3120 Commercial |
|---|---|---|---|
| | FX9802 | FX9804 | Acrylated Emulsion |
| Cured film clarity[1] | 10 | 10 | 10 |
| Pencil Hardness[1] | 4H | 3H | HB |

[1]1% IRGACURE 500 based on dry resin. All films are 1 mil dry. Cured for 1.5 minutes using UVEXS (300–500 nm, 7 mw per sq cm, 840 mj). Performance Scale of 0–10 (10 = best). Pencil Hardness Scale of 6B to 9H (6B = softest and 9H = hardest).
[2]5% IRGACURE 500 based on resin solids, cured for 2 minutes using UVEXS (300–500 nm, 7 mw per sq cm, 840 mj). Performance as per % of weight gain.

As shown by the above examples and test results, it is possible, with the present invention, to produce a radiation-curable resin having properties comparable to or better than that of previously-known radiation-curable resins, including water-dispersibility, stability, hardness, adhesion, resistance to solvents, and the like. The embodiments described herein are merely exemplary and changes and modifications in the specifically described embodiments can be carried out by one skilled in the art without departing from the scope of the invention. All such changes and modifications are intended to be included within the scope of the invention as defined in the appended claims.

I claim:

1. An uncured polymeric resin composition comprising a polymer chain made up of segments having the general formula:

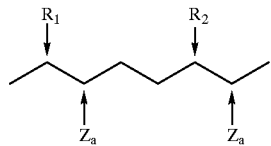

wherein MN denotes a section of the polymeric backbone which is saturated or unsaturated;
wherein the arrows denote that the pendant groups are attached to the backbone at any point, and that varying quantities of the pendant groups are present in each of the sections of each molecule of the polymeric resin;
wherein Z is a hydrocarbyl which does not substantially interfere with crosslinking hydrophilicity or stability of the composition, and where a is 0 or 1;
wherein $R_1$ is selected from the group consisting of A' and B',
where A' is

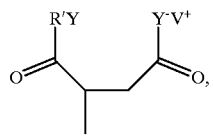

where R' is an acrylate moiety

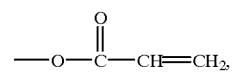

or a vinyl ether moiety —R—O—CH=CH$_2$;
where R is $C_1$–$C_{20}$ alkyl or aryl which does not substantially interfere with the crosslinking, hydrophilicity or stability of the composition;
Y is —O, —N or —S; and
where V$^+$ is an alkali metal or alkaline earth metal ion or ammonium ion which does not substantially interfere with the hydrophilicity of the composition, or is H$^+$R'''
where R''' is R'- or R"-substituted amine or phosphine;
where R" is an acrylate moiety having 2 to 12 acrylate groups and which does not substantially interfere with the stability of the composition; and
where B' is

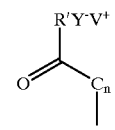

where R', Y and V$^+$ are set forth above, n is 0–10; and
wherein $R_2$ is selected from the group consisting of A" and B"
where A" is

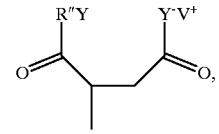

where R", Y, and V$^+$ are as set forth above, and B" is

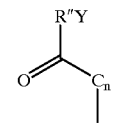

where R" and Y are as set forth above and n is 0–10.

2. The composition of claim 1 wherein a=0.
3. The composition of claim 1 wherein said polymeric backbone is polybutadiene.
4. The composition of claim 1 having a molecular weight between about 1,000 and about 100,000.
5. The composition of claim 1 having a molecular weight between about 3,000 and about 10,000.
6. The composition of claim 1 wherein Y is —O.
7. The composition of claim 1 wherein $R_1$ is A' and $R_2$ is A".
8. The composition of claim 1 wherein R' is a single-acrylate moiety.
9. The composition of claim 1 wherein R" is a five-acrylate moiety.
10. The composition of claim 1 wherein R''' is an amino acrylate.

11. The composition of claim 1 dispersed in water.

12. The composition of claim 1 dispersed in an organic solvent.

13. The composition of claim 1 having a viscosity at 45° C. less than or equal to about 300,000 cps.

14. The composition of claim 1 mixed with a crosslink initiator.

15. The composition of claim 1 made by reacting a maleic anhydride of polybutadiene with 2-hydroxyethylmethacrylate and dipentaerythritol pentaacrylate, and neutralizing the resultant compound with dimethylaminoethylmethacrylate.

16. A method of forming an adherent, cured polymeric coating on a substrate comprising:
  (a) providing a composition of claim 14 having a viscosity allowing application to said substrate by painting or spraying;
  (b) applying said composition to said substrate;
  (c) exposing said composition on said substrate to a curing method selected from the group consisting of electromagnetic radiation, electron beam or heat;
  (d) allowing said composition to adhesively cure to said substrate.

17. A method of forming an adherent cured polymeric coating on a substrate comprising:
  (a) providing a composition of claim 14;
  (b) dispersing said composition in a liquid carrier to form a dispersion of said composition in said carrier;
  (c) applying said dispersion to said substrate;
  (e) exposing said composition on said substrate to a curing method selected from the group consisting of electromagnetic radiation, electron beam or heat; and
  (f) allowing said composition to adhesively cure to said substrate.

18. The method of claim 17 wherein the concentration of said composition in said carrier is between about 10% and about 99% by weight.

19. The method of claim 17 wherein said carrier is a reactive diluent.

20. A substrate coated with a cured composition of claim 1.

* * * * *